United States Patent
Yoon et al.

(10) Patent No.: US 10,429,033 B2
(45) Date of Patent: Oct. 1, 2019

(54) QUANTUM DOT, RESIN, QUANTUM DOT SHEET AND BACK LIGHT UNIT USING THE SAME

(71) Applicant: Heesung Electronics Co., Ltd., Seoul (KR)

(72) Inventors: Na Rae Yoon, Daegu (KR); Hyun Seok Cho, Cheonan-si (KR); Do Eok Kim, Daegu (KR)

(73) Assignee: HEESUNG ELECTRONICS CO., LTD., Seoul (KR)

( * ) Notice: Subject to any disclaimer, the term of this patent is extended or adjusted under 35 U.S.C. 154(b) by 181 days.

(21) Appl. No.: 15/031,985

(22) PCT Filed: Dec. 14, 2015

(86) PCT No.: PCT/KR2015/013672
§ 371 (c)(1),
(2) Date: May 26, 2016

(87) PCT Pub. No.: WO2017/065349
PCT Pub. Date: Apr. 20, 2017

(65) Prior Publication Data
US 2017/0138567 A1    May 18, 2017

(30) Foreign Application Priority Data

Oct. 15, 2015 (KR) .................... 10-2015-0143954

(51) Int. Cl.
| | | |
|---|---|---|
| *F21V 9/30* | (2018.01) | |
| *C09K 11/08* | (2006.01) | |
| *C08F 2/50* | (2006.01) | |
| *C08L 33/06* | (2006.01) | |
| *G02F 1/1335* | (2006.01) | |
| *C09K 11/02* | (2006.01) | |
| *F21V 8/00* | (2006.01) | |
| *C08K 3/013* | (2018.01) | |
| *B82Y 20/00* | (2011.01) | |
| *B82Y 40/00* | (2011.01) | |
| *B82Y 30/00* | (2011.01) | |

(52) U.S. Cl.
CPC .............. *F21V 9/30* (2018.02); *C08F 2/50* (2013.01); *C08L 33/06* (2013.01); *C09K 11/025* (2013.01); *C09K 11/08* (2013.01); *G02B 6/005* (2013.01); *G02F 1/1335* (2013.01); *B82Y 20/00* (2013.01); *B82Y 30/00* (2013.01); *B82Y 40/00* (2013.01); *C08K 3/013* (2018.01); *Y10S 977/774* (2013.01); *Y10S 977/783* (2013.01); *Y10S 977/896* (2013.01); *Y10S 977/95* (2013.01)

(58) Field of Classification Search
None
See application file for complete search history.

(56) References Cited

U.S. PATENT DOCUMENTS

| | | | | |
|---|---|---|---|---|
| 2014/0339495 | A1* | 11/2014 | Bibl ................ | H01L 33/504 257/13 |
| 2016/0376498 | A1* | 12/2016 | Qiu ................. | C09K 11/02 252/301.36 |

OTHER PUBLICATIONS

Angshuman Nag et al., Metal-free Inorganic Ligands for Colloidal Nanocrystals: S 2-, HS-, Se 2-, HSe-, Te 2-, HTe-, TeS 3 2-, OH-, and NH 2- as Surface Ligands, Jul. 13, 2011, pp. 10612-10620, vol. 133, No. 27, Journal of the American Chemical Society, Illinois, United States.
The partial supplementary European Search Report for 15851621.1 dated Jun. 5, 2018, citing the above reference(s).
European Search Report dated Sep. 17, 2018, issued in corresponding European Patent Application No. 15851621.1.

\* cited by examiner

*Primary Examiner* — Sheeba Ahmed
(74) *Attorney, Agent, or Firm* — Hauptman Ham, LLP

(57) ABSTRACT

A quantum dot sheet includes quantum dots, light scattering agents and a resin, where the resin includes repeated units represented by the chemical formula using an aryl group of $C_6$-$C_{30}$, and a substituted or unsubstituted alkyl group of $C_1$-$C_{1000}$.

2 Claims, 8 Drawing Sheets

QUANTUM DOT, RESIN, QUANTUM DOT SHEET AND BACK LIGHT UNIT USING THE SAME

CROSS REFERENCE TO RELATED APPLICATION

This application claims the priority of Korean Patent Applications No. 10-2015-0143954 filed on Oct. 15, 2015, in the Korean Intellectual Property Office. Further, this application is the National Phase application of International Application No. PCT/KR2015/013672 filed on Dec. 14, 2015, which is incorporated herein by reference in its entirety.

TECHNICAL FIELD

The present disclosure relates to a quantum dot, a resin, a quantum dot sheet, and a back light unit using the same, and more particularly, to a quantum dot including an inorganic ion ligand, a resin with excellent property of blocking oxygen and moisture, a quantum dot sheet with improved light conversion efficiency, and a back light unit including the same.

BACKGROUND ART

A quantum dot (QD) is a semiconductor particle with a nano size. Since the QD has the very small size, a quantum confinement effect is shown. The quantum confinement effect means a phenomenon in which when an object is decreased to a nano size or less, a band gap of the object is increased. Accordingly, when light with a wavelength having larger energy than the band gap of the quantum dot is incident to the quantum dot, the quantum dot is in an excited state by absorbing the light and falls to a ground state while emitting the light having a predetermined wavelength. The wavelength of the emitted light has a value corresponding to the band gap. Since light emission characteristic due to the quantum confinement effect varies according to the size, the composition, and the like of the quantum dot, the quantum dot has been variously used in various light emitting devices and electronic devices by adjusting the size, the composition, and the like thereof.

A quantum dot liquid crystal display (QD-LCD) having excellent color reproducibility may be produced by using the quantum dot. The quantum dot is used as a phosphor in the display device, and in order to optically coupling a light source and the quantum dot, a sheet (hereinafter, referred to as a quantum dot sheet) prepared by distributing the quantum dot in a resin is used.

The quantum dot is formed of a core, a shell, and a ligand. The core serves to emit light, and the shell is formed by covering the core on the surface of the core to protect the core. In addition, the ligand is formed by covering the shell so that the quantum dot is distributed in an organic solvent well. Generally, the ligand is formed of an organic material, such as, trioctylphosphine, oleic acid, and amine.

However, even though the quantum dot itself is made of the semiconductor material, when the organic ligand is bonded, the bonded organic ligand acts as an insulating barrier layer, and thus, there is a limitation in that the electrical conductivity of the quantum dot is deteriorated. Further, the organic ligand is a polymer material, and van der Waals force acts as attraction force between the adjacent organic ligands. The attraction force causes aggregation, condensation, or the like of the quantum dots, and thus, there is a problem in that the light emission efficiency of the QD-LCD is deteriorated.

In the quantum dot sheet, a plurality of quantum dots and a light scattering agent are distributed in the resin.

The resin serves to protect the quantum dots from an external shock and environment, and distribute and fix the quantum dots and the light scattering agent. The resin serves as a primary element for determining reliability, cost, and performance of the quantum dot sheet. The resin requires a high refractive index, characteristics of blocking oxygen and moisture, and excellent heat resistance in order to increase light extraction efficiency of the quantum dots and secure the reliability of the quantum dot sheet.

A general resin used in the quantum dot sheet in the related art is an epoxy resin. The epoxy resin which is low in cost and is a sealing material of an optical member has an excellent characteristic, but has low force of blocking the oxygen and the moisture and a yellowing phenomenon at a high temperature, and as a result, there is a limit that the epoxy resin is insufficient to be applied to a high-efficiency light source device such as a quantum dot liquid crystal display (QD-LCD).

In the quantum dot liquid crystal display (QD-LCD), various methods for combining the quantum dots and the light source may be provided, but an on-surface method for manufacturing a back light unit (BLU) by placing the quantum dot sheet on a light guide plate is primarily used.

The back light unit in the related art has a structure in which the quantum dot sheet is stacked on the top of the light guide plate. Light emitted from the light source is diffused in the light guide plate and the light diffused in the light guide plate is incident in the quantum dot sheet toward the top. While the incident light passes through the quantum dots distributed on the quantum dot sheet, a wavelength of the light is converted. It is advantageous in that the quantum dot sheet may be applied to a display module while not changing a thickness or a structure of a liquid crystal display in the related art.

However, in the back light unit in the related art, when the quantum dot sheet is stacked by the on-surface method, a base film of the quantum dot sheet is in contact with the top of the light guide plate. In general, a refractive index of the light guide plate is approximately in the range of about 1.4 to 1.5 and the base film of the quantum dot sheet also has a refractive index in a range similar thereto. A refractive index difference between the light guide plate and a base sheet is slight, and as a result, light incident in the light guide plate is transmitted toward the base film while a full-reflection phenomenon cannot smoothly occur. Therefore, there is a problem that the incident light cannot be uniformly diffused in the light guide plate and the light is intensively emitted around a light receiving unit of the light guide plate. As a result, the quantum dot sheet cannot uniformly receive the light from the light guide plate. Therefore, the back light unit in the related art has a limit that even though a quantum dot having excellent color reproducibility is used as a fluorescent substance, it has low light conversion efficiency.

Further, the back light unit in the related art is a structure in which the quantum dot sheet is simply stacked on the top of the light guide plate. The quantum dot sheet which has a thin film shape is vulnerable to heat generated when the light is converted at the quantum dot, and the like. Accordingly, when only the quantum dot sheet is just stacked on the top of the light guide plate, there is a problem that the quantum dot sheet curls or wrinkles as the back light unit operates occurs.

The back light unit including the quantum dot sheet which curls or wrinkles cannot supply uniform light to a liquid crystal panel. Furthermore, a liquid crystal display device including the quantum dot sheet and the back light unit has a problem that a color difference error occurs.

DISCLOSURE

Technical Problem

An object of the present disclosure is to provide a quantum dot including inorganic ion ligands which act as repulsive force between the quantum dots. Furthermore, the present disclosure also provides a quantum dot sheet including the quantum dots and with improved condensation between the quantum dots.

Another object of the present disclosure is to provide a resin having an excellent property of blocking oxygen and moisture. Furthermore, the present disclosure also provides a quantum dot sheet with improved lifespan and light conversion efficiency of the quantum dots by protecting the quantum dots from an external environment, by including the resin.

Yet another object of the present disclosure is to provide a back light unit in which total light reflection actively occurs inside a light guide plate and the light is uniformly diffused to the entire light guide plate. Furthermore, the present disclosure also provides a back light unit with improved light conversion efficiency and improved color difference defect by attaching the quantum dot sheet to the top of the light guide plate.

The objects of the present disclosure are not limited to the aforementioned objects, and other objects, which are not mentioned above, will be apparent to a person having ordinary skill in the art from the following description.

Technical Solution

One aspect of the present disclosure provides a quantum dot including: a core including a semiconductor material; and inorganic ion ligands covering the surface of the core, in which the inorganic ion ligand includes a halogen-group or chalcogen-group element.

Further, the quantum dot may further include a shell covering the core between the core and the inorganic ion ligand and including the semiconductor material.

Further, the semiconductor material may be semiconductors of groups II-VI, III-V, IV-VI, and IV and mixtures thereof.

Another aspect of the present disclosure provides a method of preparing a quantum dot, in which the method includes: preparing a mixed solution by mixing a quantum dot solution including organic ligands and a surfactant solution having a halogen or chalcogen polarity at a predetermined volume ratio; and extracting the quantum dot including the inorganic ion ligands from the mixed solution.

Further, the extracting of the quantum dot may include: centrifuging the mixed solution; separating a part including the quantum dot from the solution obtained in the centrifuging; and removing the organic ligand which remains around the quantum dot by mixing the part including the quantum dot and an organic solvent.

The resin may be an acrylic resin including an aromatic ring in a main chain.

Yet another aspect of the present disclosure is to provide a back light unit, in which the quantum dot sheet adheres onto the light guide plate so that an air layer is formed between the light guide plate and the quantum dot sheet, and the light guide plate and the quantum dot sheet are fixed to each other.

Further, embossed patterns having regular heights may be included on the top of the light guide plate, the air layer may be formed between the light guide plate and the quantum dot sheet by the embossed patterns, and an adhesive unit may be formed between the embossed patterns and the quantum dot sheet, and the light guide plate and the quantum dot sheet are fixed to each other.

Further, at least one spacer may be included between the light guide plate and the quantum dot sheet, the air layer may be formed between the light guide plate and the quantum dot sheet by the spacer, and adhesive units may be formed on at least one surface of the top of the light guide plate and the bottom of the quantum dot sheet, and thus, the light guide plate and the quantum dot sheet may be fixed to each other.

Advantageous Effects

According to the quantum dot of the present disclosure, the inorganic ion ligand has polarity to act as repulsive force between the quantum dots, and thus, the condensation between the quantum dots may be improved. Furthermore, the quantum dots with improved condensation are included in the quantum dot sheet to improve color reproducibility of light emitted through the quantum dot sheet.

Further, according to the resin of the present disclosure, the resin with an excellent property of blocking oxygen and moisture is used to protect the quantum dots from the external environment and the resin is included in the quantum dot sheet to improve emission efficiency of light emitted through the quantum dot sheet.

Further, according to the back light unit of the present invention, the light is diffused to the entire light guide plate by forming the air layer between the light guide plate, and thus, the quantum dot sheet to supply uniform light to the quantum dot sheet adhering to the top of the light guide plate, and the quantum dot sheet is fixed to the top of the light guide plate to improve light conversion efficiency and improve a color difference defect.

BEST MODE

Figure 1:
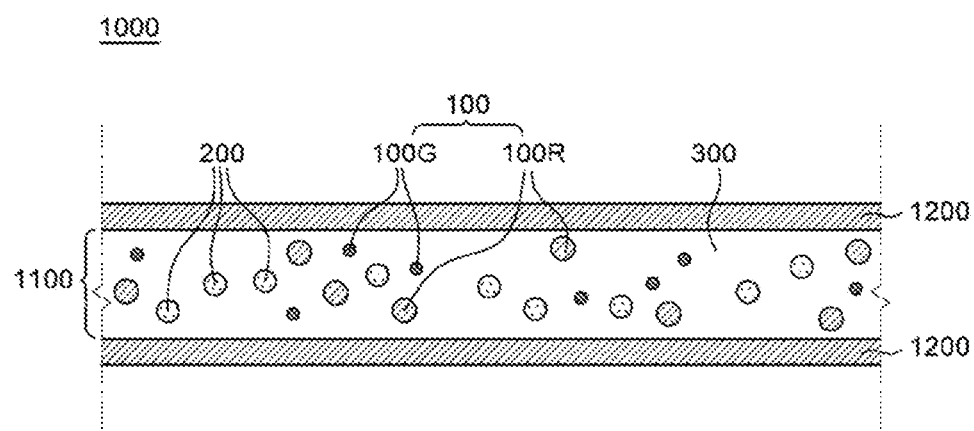
FIG. 1 is a schematic cross-sectional view of a quantum dot sheet according to an exemplary embodiment of the present disclosure.

Various advantages and features of the present disclosure and methods accomplishing thereof will become apparent from the following description of exemplary embodiments with reference to the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the present specification.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

Hereinafter, a quantum dot sheet including a quantum dot, a light scattering agent, and a resin according to an exemplary embodiment will be described in detail with reference to the accompanying drawings.

FIG. 1 is a schematic cross-sectional view of a quantum dot sheet 1000 according to an exemplary embodiment of the present disclosure.

Referring to FIG. 1, the quantum dot sheet 1000 includes a light conversion layer 1100, and a pair of barrier layers 1200 covering the top and the bottom of the light conversion layer 1100.

The light conversion layer 1100 includes a quantum dot 100 to convert light incident to the light conversion layer 1100 into light having a desired wavelength. For example, if the light incident to the light conversion layer 1100 is blue light having a wavelength range between about 430 nm to about 470 nm, the light conversion layer 1100 may include a quantum dot 100G emitting green light having a wavelength range between about 520 nm to about 560 nm by absorbing the blue light to convert the blue light into the green light. Further, the light conversion layer 1100 may further include a quantum dot 100R emitting red light having a wavelength range between about 630 nm to about 660 nm by absorbing the blue light to convert the blue light into the red light.

As illustrated in FIG. 1, the light conversion layer 1100 is formed so that a plurality of quantum dots 100 and a plurality of light scattering agents 200 are distributed in the resin 300.

In order to improve luminance and color reproducibility of the light emitted from the light conversion layer 1100 and improve the light conversion efficiency of the quantum dot sheet 1000 including the light conversion layer 1100, components and structures of the quantum dots 100, the light scattering agents 200, and the resin 300 included in the light conversion layer 1100 may be improved. Hereinafter, the configurations of the quantum dots 100, the light scattering agents 200, and the resin 300 included in the light conversion layer 1100 of the present disclosure will be described in detail.

Quantum Dot 100

Figure 2:
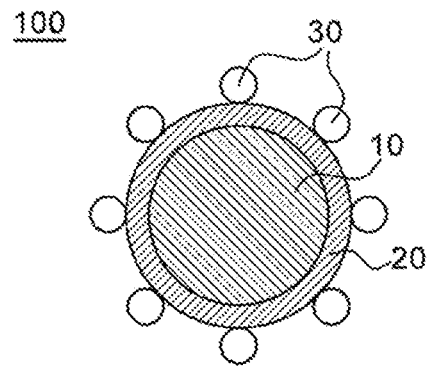
FIG. 2 is a schematic cross-sectional view of a quantum dot according to the exemplary embodiment of the present disclosure.

FIG. 2 is a schematic cross-sectional view of the quantum dot 100 according to the exemplary embodiment of the present disclosure.

Referring to FIG. 2, the quantum dot 100 according to the exemplary embodiment of the present disclosure includes a core 10, a shell 20 covering the core 10, and inorganic ion ligands 30 around the core 10 and the shell 20.

The quantum dot 100 is a semiconductor particle having a diameter of several nanometers. The core 10 emits light having a predetermined wavelength at the center of the quantum dot 100. The shell 20 may be formed on the surface of the core 10 by covering the core 10 in order to protect the core 10.

The core 10 and the shell 20 are formed of semiconductor materials of groups II-VI, III-V, IV-VI, and IV on the periodic table or a compound thereof. For example, the group II-VI semiconductor compound may be CdS, CdSe, CdTe, ZnS, ZnSe, ZnTe, ZnO, HgS, HgSe, HgTe, or binary compounds as combinations thereof. The group III-V semiconductor compound may be GaN, GaP, GaAs, GaSb, AlN, AlP, AlAs, AlSb, InN, InP, InAs, InSb, or binary compounds of combinations thereof. The group IV-VI semiconductor compound may be SnS, SnSe, SnTe, PbS, PbSe, PbTe, or binary compounds of combinations thereof. The group IV element or compound may be Si, Ge, SiC, SiGe, or a combination thereof. Other semiconductor compounds may be ternary compounds, quaternary compounds, or the like including elements of groups II-VI, III-V, IV-VI, and IV on the periodic table. Furthermore, the semiconductor materials or compounds are not limited to those described above, but may be any semiconductor materials or compounds which are known to those skilled in the art.

As illustrated in FIG. 2, the inorganic ion ligand 30 is formed to cover the surface of core 10 or the core 10-shell 20.

The inorganic ion ligand 30 includes the elements of a halogen group or a chalcogen group. The inorganic ion ligand 30 may be in a form of a monatomic ion of the element or a polyatomic ion including the elements.

The inorganic ion ligand 30 may be, for example, a monatomic ion such as bromine ion ($Br^-$), chloride ion ($Cl^-$), hydrofluoric ion ($F^-$), iodine ion ($I^-$), oxide ion ($O^{2-}$), sulfide ion ($S^{2-}$), and tellurium ion ($Te^{2-}$). The inorganic ion ligand 30 may be, for example, a polyatomic ion such as oxide ion ($O_2^{2-}$), arsenic ion ($AsO_4^{3-}$), bromate ion ($BrO_3^-$), bromate hydrogen ion ($BrO^-$), hydroxide ion ($OH^-$), chlorite ion ($ClO_3^-$), iodic acid ion ($IO_3^-$), hydrogen sulfide ion ($HS^-$), nitrate ion ($NO_3^-$), phosphate ion ($PO_4^{3-}$), and sulfate ion ($SO_4^{2-}$). Furthermore, the inorganic ion ligand 30 may be formed of any one ion of the aforementioned ions and formed by mixing two or more of the aforementioned ions.

The inorganic ion ligand 30 has excellent electrical conductivity and charge mobility as compared with the existing organic ligand 40 and has a negative charge property. Van der Waals force acts as attraction force between the existing organic ligands 40, while electric force acts as repulsion force between the inorganic ion ligands 30. Accordingly, the quantum dots 100 including the inorganic ion ligands 30 may be spaced apart from each other at regular intervals.

Since the quantum dots 100 include the inorganic ion ligands 30, condensation among the quantum dots 100 is resolved. When the condensation is resolved to uniformly distribute the quantum dots 100 in the light conversion layer 1100, the inorganic ion ligands 30 cover the quantum dot 100, and thus, the defect on the surface of the quantum dot 100 is reduced. Further, when the quantum dots 100 are uniformly distributed in the light conversion layer 1100, efficient collision between the quantum dots 100 and light incident to the light conversion layer 1100 is increased. Accordingly, the quality of the light emitted from the light conversion layer 1100 may be improved.

Hereinafter, a method of preparing the quantum dot 100 including the inorganic ion ligands 30 will be described in detail with reference to FIGS. 3A to 3B and FIGS. 4A to 4C.

Figure 3A:
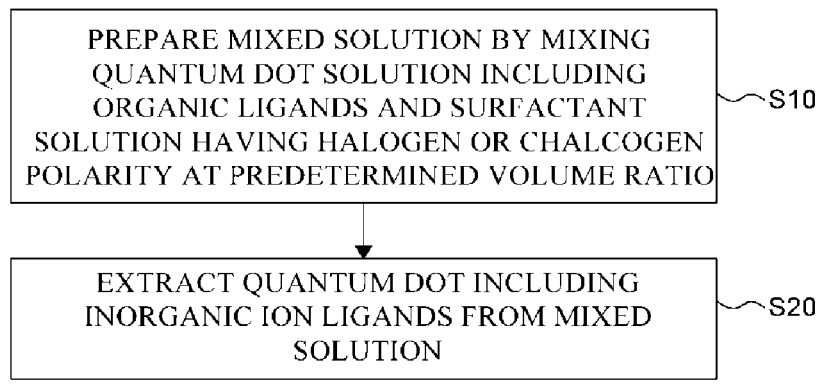
FIGS. 3A to 3B are a schematic flowchart of a method of preparing a quantum dot according to the exemplary embodiment of the present disclosure.
Figure 3B:
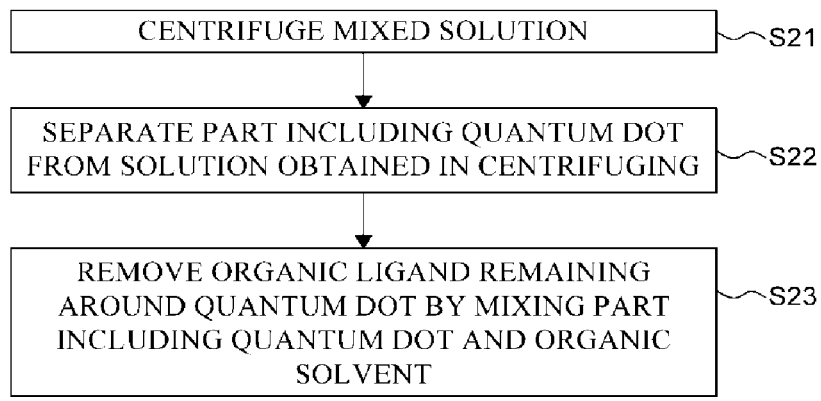
Figure 4A:
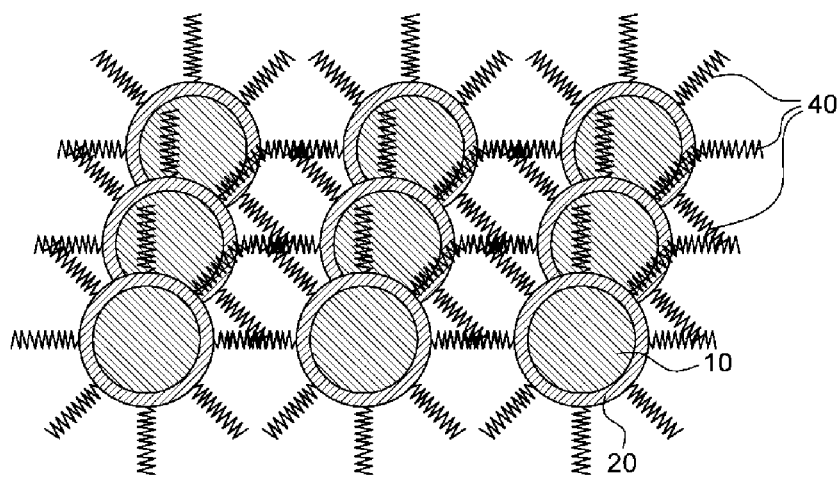
FIGS. 4A to 4C are a perspective view illustrating a flow of the method of preparing the quantum dot.
Figure 4B:
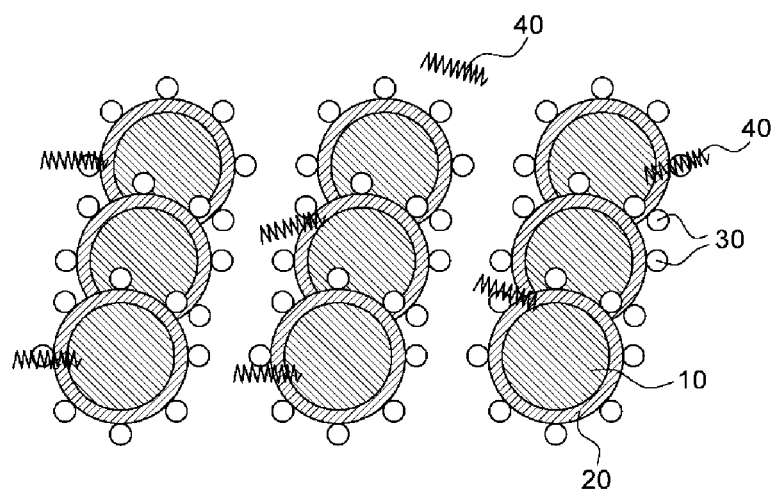
Figure 4C:
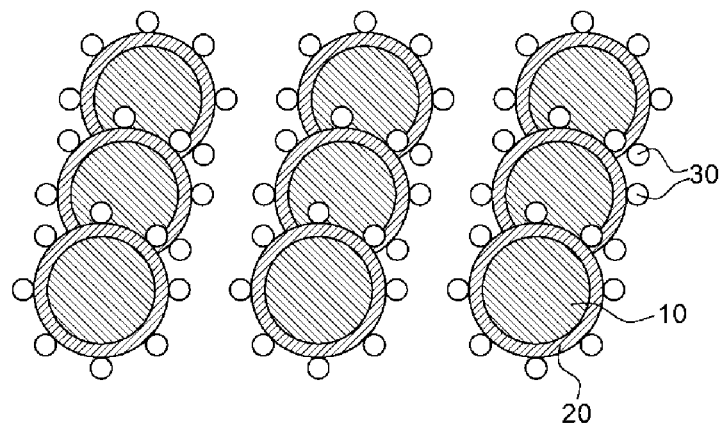

FIGS. 3A to 3B are a schematic flowchart of a method of preparing the quantum dot 100 according to the exemplary embodiment of the present disclosure and FIGS. 4A to 4C are a perspective view illustrating a flow of the method of preparing the quantum dot 100.

Referring to FIGS. 3A to 3B, the method of preparing the quantum dot 100 including the inorganic ion ligands 30 according to the exemplary embodiment of the present disclosure includes preparing a mixed solution by mixing a quantum dot solution including the organic ligands 40 and a surfactant solution having halogen or chalcogen polarity at a predetermined volume ratio (S10); and extracting the quantum dot 100 including the inorganic ion ligands 30 from the mixed solution (S20).

First, the mixed solution is prepared by mixing the quantum dot solution including the organic ligands 40 and the surfactant solution having halogen or chalcogen polarity (S10).

In step S10, the quantum dot solution may be a quantum dot solution including the known organic ligands 40, and the surfactant solution having the polarity may be a known surfactant solution including the ion of a halogen group or chalcogen group.

For example, the organic ligand 40 may be an organic material such as trioctylphosphine (TOP), oleic acid, and amine, an amine-based compound having an alkyl group of carbon atoms 6 to 30, a carboxyl acid compound, or the like, and the surfactant solution having the halogen polarity may be cetrimonium bromide (CTAB). However, the quantum dot solution and the surfactant solution are not limited thereto, and may be non-restrictively used as long as the ion ligand of the halogen group or chalcogen group may be bonded with the quantum dot by substitution reaction.

Referring to FIGS. 4A and 4B, in step S10, the substitution reaction in which the organic ligand 40 is substituted with the inorganic ion ligand 30 occurs. When mixing the quantum dot solution including the organic ligand 40 and the CTAB solution, the bromine ion ($Br^-$) which is present in the CTAB in an active state removes the organic ligand 40 bonded with the quantum dot to be bonded with the quantum dot. The substitution reaction may occur in the mixed solution state within several seconds.

Meanwhile, in step S10, in order to facilitate the substitution reaction of the ligand, the mixed solution may be stirred and mixed by adding a catalyst to the mixed solution or using an agitator and the like.

Next, the quantum dot 100 including the inorganic ion ligands 30 is extracted from the mixed solution (S20).

Particularly, the step S20 includes centrifuging the mixed solution (S21); separating a part including the quantum dot from the solution obtained in the centrifuging step (S22); and removing the organic ligands 40 which remain around the quantum dot by mixing the part including the quantum dot and an organic solvent (S23).

In the centrifuging step (S21), the organic ligands 40 and the quantum dot 100 including the inorganic ion ligands 30 in the mixed solution are separated from each other through centrifugal force by rotation. In this case, layers are divided in the solution according to a density difference between two materials.

Thereafter, in the solution obtained in the centrifuging step (S21), only the part including the quantum dot 100 is separated (S22).

As illustrated in FIG. 4C, the part including the quantum dot 100 is put in the organic solvent such as ethanol to remove the organic ligands 40 remaining around the quantum dot (S23). In step S23, any organic solvent having a hydrophobic property with the organic ligands 40 may be non-restrictively used.

The remaining organic ligands 40 are removed to obtain the quantum dot 100 including the inorganic ion ligands 30 according to the exemplary embodiment of the present disclosure.

Light Scattering Agent 200

Referring to FIG. 1, the light conversion layer 1100 includes a plurality of light scattering agents 200 which are particles formed to have a predetermined curve on the surface.

The light scattering agents 200 may be formed of metal oxide particles, air bubbles, glass beads, or polymer beads, and formed of a mixture thereof. Besides, the light scattering agents 200 are not limited to the aforementioned materials and may be formed of any material which is known to those skilled in the art.

The light scattering agents 200 formed of the materials may have relatively high or low refractive indexes with respect to the resin 300 to be described below. For example, a ratio of the refractive index between the light scattering agent 200 and the resin 300 may be in the range of about 0.3 to 2.0. By the difference in refractive index, the light scattering agent 200 changes a path of the light incident to the light conversion layer 1100 and may diffuse the emitted light.

The light scattering agent 200 allows the light to be dispersed in various directions in the light conversion layer 1100 to increase a region where the incident light and the quantum dot 100 meet each other.

The light scattering agents 200 included in one light conversion layer 1100 have a uniform size. The size of the light scattering agent 200 may be, for example, about 10 μm or less.

The light scattering agent 200 may preferably have an overall spheral shape as illustrated in FIG. 1, but may have an oval shape beyond the spheral shape, a distorted shape, or other unintended shapes at the time of the actual preparation.

In FIG. 1, the example in which the light scattering agent 200 has the spheral shape is exemplified, but is just for convention of description.

Resin 300

The resin 300 illustrated in FIG. 1 serves to protect the quantum dots 100 from external impact, environment, and the like, and distribute and fix the quantum dots 100 and the light scattering agents 200. In detail, the resin 300 of the present disclosure may have an excellent property of blocking oxygen and moisture to protect the quantum dots 100 from an external environment. Further, the resin 300 covers the quantum dots 100 and uniformly distributes the quantum dots 100 in the quantum dot sheet 1000.

In this case, in the resin 300 of the present disclosure, an average interatomic distance is preferably 0.2 nm to 3.0 nm and more preferably 0.3 nm to 1.0 nm. Generally, since a diameter of an oxygen molecule is 0.32 nm and a diameter of a water molecule is 0.33 nm, the average interatomic distance of the resin 300 may be smaller than those of the oxygen molecule and the water molecule to suppress the oxygen molecule and the water molecule from penetrating to the inside of the quantum dot sheet 1000.

The resin 300 of the present disclosure may preferably be an acryl-based resin including an aromatic ring in a main chain. In this case, the resin 300 may include repeated units represented by the following Chemical Formula 1.

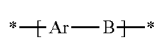

[Chemical Formula 1]

In Chemical Formula 1, Ar is an aryl group of $C_6$-$C_{30}$, and B is a substituted or unsubstituted alkyl group of $C_1$-$C_{1000}$.

In Chemical Formula 1, B is preferably $C_2$-$C_{20}$ and more preferably $C_2$-$C_5$ when considering that B serves to reduce the average interatomic distance of the resin 300.

Meanwhile, the resin 300 of the present disclosure is a compound cured from a photocurable resin composition, and more particularly, the photocurable resin composition includes an acrylic binder, an aromatic oligomer, a multifunctional monomer, and a photoinitiator.

If the acrylic binder has an acrylate functional group, a kind thereof is not particularly limited, but for example, an acrylate monomer, an acrylate oligomer, or a mixture thereof may be used. In this case, the acrylate monomer or the acrylate oligomer includes at least one acrylate functional group capable of being added to a curing reaction.

As the acrylate oligomer, a urethane acrylate oligomer, an epoxy acrylate oligomer, polyester acrylate, polyether acrylate, or a mixture thereof may be used. Further, as the acrylate monomer, dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylolpropane ethoxy triacrylate, 1,6-hexanediol diacrylate, propoxylated glycero-triacrylate, tripropylene glycol diacrylate, ethylene glycol diacrylate, or mixtures thereof may be preferably used, but the acrylate monomer is not limited thereto. Further, the acrylic binder may be a copolymer of two kinds or more compounds including an acrylate functional group.

The weight-average molecular weight of the acrylic binder according to the present disclosure is preferably 5,000 to 50,000 and particularly, more preferably 10,000 to 30,000. When the weight-average molecular weight of the acrylic binder is less than 5,000, basic properties such as heat resistance, chemical resistance, mechanical strength, and adhesion to the adjacent layer which are required in the quantum dot sheet 1000 formed may not be satisfied. Further, when the weight-average molecular weight of the acrylic binder is more than 50,000, the viscosity is excessively high, and as a result, it is difficult to properly distribute the quantum dots 100 and the light scattering agents 200 and uniformity in thickness of the quantum dot sheet 1000 is deteriorated.

Meanwhile, the acrylic binder may further include a functional group having polarity capable of ion-bonding with the water molecule at the terminal. When the functional group having polarity is further included in the acrylic binder, moisture penetration performance may be further improved due to surface absorption of the moisture. The functional group having polarity is not limited thereto, but may include a hydroxyl group or an acryl group.

The acrylic binder may be included in the amount of 10 wt % to 60 wt % with respect to the photocurable resin composition. When the content of the acrylic binder is less than 10 wt %, photocuring may not sufficiently occur, and when the content is more than 60 wt %, the processability is deteriorated or the property of the cured resin 300 may be deteriorated.

Meanwhile, the aromatic oligomer gives the property of blocking oxygen and moisture to the quantum dot sheet 1000 of the present disclosure. In detail, the aromatic oligomer may suppress the penetration of oxygen and moisture by decreasing the average interatomic distance of the photocurable resin 300. Further, the aromatic oligomer serves to adjust the curing of the quantum dot sheet 1000 of the present disclosure and adjust flexibility of the quantum dot sheet 1000. Further, the oligomer serves to distribute and then fix the quantum dots 100 and the light scattering agents 200 included in the quantum dot sheet 1000.

The aromatic oligomer includes an aromatic ring in the main chain. Further, the aromatic oligomer includes a functional group including a double bond, as a compound which is photocurable with the acrylic binder or the monomer. More particularly, the aromatic oligomer includes a vinyl group or an acrylate group as the functional group. In this case, the vinyl group or the acrylate group may be a structure directly substituted to the aromatic ring and may also be a structure substituted to an alkyl group connected to the aromatic ring. The vinyl group or the acrylate group included in the aromatic oligomer is condensed by reacting with the functional group of the acrylic binder or the multifunctional monomer to form the resin 300 having a chain structure.

The resin 300 of the present disclosure is a resin in which the composition including the aromatic oligomer including the aromatic ring in the main chain is cured and the average interatomic distance of the resin 300 is reduced. Since the resin 300 has a smaller average interatomic distance than the diameters of the oxygen molecule and the water molecule, the resin 300 is used in the quantum dot sheet 1000 to suppress the penetration of the oxygen molecule and the water molecule into the quantum dot sheet 1000. Accordingly, the quantum dot sheet 1000 including the aforementioned resin 300 may minimize reduction in luminance over time and improve emission efficiency of the light.

The aromatic oligomer may include repeated units represented by the following Chemical Formula 1.

[Chemical Formula 1]

In Chemical Formula 1, Ar is an aryl group of $C_6$-$C_{30}$, and B is a substituted or unsubstituted alkyl group of $C_1$-$C_{1000}$.

The aromatic oligomer may be included in the amount of 40 wt % to 80 wt % with respect to the photocurable resin composition. When the content of the acrylic binder is less than 40 wt %, the average interatomic distance of the resin 300 formed by curing the photocurable resin composition is increased, and thus, it is difficult to suppress the penetration of the oxygen molecule and the water molecule. When the content is more than 80 wt %, the resin composition may not be cured well.

Meanwhile, the multifunctional monomer has an object in giving distribution stability of the quantum dots 100 and the light scattering agents 200 and giving proper viscosity in addition to a basic object in giving photo-polymerization ability to the photocurable resin composition.

The multifunctional monomer may include a compound having an acrylate group of preferably 3 to 15 functions, as a photocurable compound together with the aforementioned photocurable binder or the aromatic oligomer.

The multifunctional monomer may be a hydroxy group-containing acrylate-based compound such as 2-hydroxyethyl acrylate, 2-hydroxypropyl acrylate, pentaerythritol triacrylate, or dipentaerythritol pentaacrylate; a water-soluble acrylate-based compound such as polyethylene glycol diacrylate or polypropylene glycol diacrylate; a multifunctional polyester acrylate-based compound of polyalcohol such as trimethylolpropane triacrylate, pentaerythritol tetraacrylate or dipentaerythritol hexaacrylate; an acrylate-based compound such as trimethylolpropane, polyfunctional alcohol such as hydrogenated bisphenol A or bisphenol A, an ethylene oxide adduct such as polyphenol such as biphenol and/or a propylene oxide adduct; a polyfunctional or monofunctional polyurethane acrylate which is isocyanate modified material of the hydroxy group-containing acrylate-based compound; an epoxy acrylate-based compound such as bisphenol A diglycidyl ether, hydrogenated bisphenol A diglycidyl ether or a (meth) acrylic acid adduct of a phenol novolac epoxy resin; a caprolactone-modified acrylate-based compound such as caprolactone-modified ditrimethylolpropane tetraacrylate, ε-caprolactone-modified dipentaerythritol acrylate, caprolactone-modified hydroxylpivalic neopentyl glycolester diacrylate. In addition, the multifunctional monomer may use either alone or in combination of two or more kinds.

Particularly, the multifunctional monomer is preferably pentaerythritol triacrylate, trimethylolpropane triacrylate, dipentaerythritol hexaacrylate, caprolactone-modified ditrimethylolpropane tetraacrylate, or the like.

The content of the photopolymerizable monomer may be included in the amount of 5 wt % to 30 wt % with respect to the entire weight of the photocurable resin composition, and preferably 7 wt % to 20 wt %. When the content of the photopolymerizable monomer is less than 5 wt %, photocuring may not sufficiently occur, and when the content is more than 30 wt %, the property of the cured resin 300 may be deteriorated.

Meanwhile, the photocurable resin composition of the present disclosure includes a photoinitiator so as to be cured by ultraviolet rays. If the photoinitiator is a UV-curable initiator which is generally used, the kind thereof is not limited, but for example, the photoinitiator may include one or more selected from the group consisting of 1-hydroxycyclohexyl phenyl ketone, benzyl dimethyl ketal, hydroxy dimethyl acetophenone, benzoin, benzoin methyl ether, benzoin ethyl ether, benzoin isopropyl ether, and benzoin butyl ether. Further, a photoinitiator represented by product names such as Daracur 1173, Irgacure 184, and Irgacure 907 (manufactured by Ciba Corporation) may be used.

The photoinitiator may be included in the amount of 0.1 wt % to 10 wt % with respect to the entire photocurable resin composition and preferably 1 wt % to 5 wt %. When the content of the photoinitiator is less than 0.1 wt %, the photocuring does not occur well, and when the content of the photoinitiator is more than 10 wt %, the transmittance of the quantum dot sheet 1000 is deteriorated or the quantum dots 100 and the light scattering agents 200 may not be distributed well.

Meanwhile, in the photocurable resin composition of the present disclosure, one or more solvents may be included in order to give appropriate solubility and viscosity.

If the solvent is an organic solvent which is generally used, the kind thereof is not limited, but the solvent may include one or more selected from the group consisting of benzene, toluene, methyl ethyl ketone, methyl isobutyl ketone, acetone, ethanol, tetra-hydro furfuryl alcohol, propyl alcohol, propylene carbonate, N-methyl pyrrolidinone, N-vinyl pyrrolidinone, N-acetyl pyrrolidinone, N-hydroxymethyl-pyrrolidinone, N-butyl-pyrrolidinone, N-ethyl pyrrolidinone, N—(N-octyl) pyrrolidinone, N—(N-dodecyl) pyrrolidinone, 2-methoxy ethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, hexafluoroantimonate, monoalkyl ether of ethylene glycol, and dialkyl ether of ethylene glycol.

Meanwhile, the photocurable resin composition of the present disclosure may further include other additives capable of removing bubbles or dissipating charges of the photocurable resin composition.

The quantum dot sheet 1000 formed by including the quantum dots 100, the light scattering agents 200, and the resin 300 as described above has improved light conversion efficiency as compared with the existing quantum dot sheet.

Meanwhile, according to the resin 300 according to the exemplary embodiment of the present disclosure, a barrier layer 1200 may be omitted, but as illustrated in FIG. 1, the quantum dot sheet 1000 may further include the barrier layer 1200. The barrier layer 1200 may be formed to be in contact with the top and the bottom of the light conversion layer 1100.

The barrier layer 1200 serves to protect the quantum dots 100 vulnerable to oxygen, moisture, and the like from an external environment such as heat, oxygen, and moisture. Accordingly, the barrier layer 1200 may be formed of a material having low oxygen permeability and moisture permeability and a material having excellent heat resistance. Further, the barrier layer 1200 transmits light incident to the light conversion layer 1100 and light emitted from the light conversion layer 1100. Accordingly, the barrier layer 1200 is preferably formed of a material having excellent light transmittance.

The material forming the barrier layer 1200 may be an inorganic material such as, silicon oxide or metal oxide, and the like, and may be an organic material such as an acryl-based or epoxy-based resin. Furthermore, the barrier layer 1200 may have a single-layer structure being consisted of an inorganic layer or a multilayered structure in which inorganic layers and organic layers are stacked. Besides, the barrier layer 1200 is not particularly limited, and may be formed by a material or a structure which is known to those skilled in the art.

Thickness Controlling Bead 201

Figure 5:
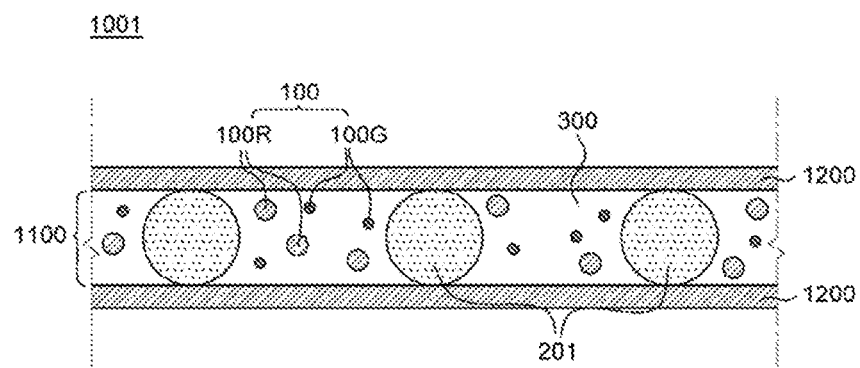
FIG. 5 is a schematic cross-sectional view of a quantum dot sheet according to another exemplary embodiment of the present disclosure.

FIG. 5 is a schematic cross-sectional view of a quantum dot sheet 1001 according to another exemplary embodiment of the present invention.

Since quantum dots 100, a resin 300, and a barrier layer 1200 included in the quantum dot sheet 1001 according to the exemplary embodiment are the same as the components of the quantum dot sheet 1000 according to the exemplary embodiment, duplicated description will be omitted.

A light conversion layer 1100 includes a plurality of thickness controlling beads 201 which are particles of which the surface is formed to have a predetermined curve.

The thickness controlling bead 201 may change a path of light incident in the light conversion layer 1100 and diffuse emitted light like the light scattering agent 200 described above. Furthermore, the thickness controlling bead 201 serves to diffuse the light and also control the thickness of the quantum dot sheet 1001 according to the exemplary embodiment.

The thickness controlling bead 201 may be formed by metal oxide particles, air bubbles, glass beads, or polymer beads and formed by a mixture in which the metal oxide particles, the air bubbles, the glass beads, and the polymer beads are mixed. Besides, the thickness controlling bead 201 is not limited to the aforementioned materials and may be made of a predetermined material known to those skilled in the art.

The thickness controlling bead 201 made of the above-described materials may have a relatively higher or lower refractive index as compared with a resin 300 to be described below. For example, a ratio of the refractive index between the thickness controlling bead 201 and the resin 300 may be approximately in the range of 0.3 to 2.0.

By a difference of the refractive index, the thickness controlling bead 201 may change the path of light incident in the light conversion layer 1100 and diffuse the emitted light. The thickness controlling bead 201 allows the light to spread in various directions in the light conversion layer 1100 to increase an area where the incident light and the quantum dot 100 meet each other.

All of the thickness controlling beads 201 included in one light conversion layer 1100 have a uniform size. The size of the thickness controlling bead 201 may be, for example, approximately 50 to 150 μm. For reference, the thickness controlling bead 201 having such a size is a particle which is larger by approximately a hundred thousand as compared with the quantum dot 100 having several nanometers approximately in the range of 1 to 10 nm. In general, the known light scattering agent 200 has a size of several μm, but the thickness controlling bead 201 used in the present invention is intentionally manufactured to have a larger size than the size of the light scattering agent 200. The thickness controlling bead 201 is manufactured by using a known method.

The thickness controlling bead 201 preferably has a spheral shape, as illustrated in FIG. 5, but in actual manufacturing, the thickness controlling bead 201 may have an oval shape, a twisted shape, or other unintended predetermined shapes other than the spheral shape. In FIG. 5, it is illustrated that the thickness controlling bead 201 is a globe, but this is just for easy description.

The size of the thickness controlling bead 201 means a diameter of the thickness controlling bead 201 when the thickness controlling bead 201 has the spheral shape. Further, when the thickness controlling bead 201 has not the spheral shape but any shape, a diameter of a globe having a minimum size set to include all of the thickness controlling beads 201 therein may be set as the size of the thickness controlling bead 201. As a method for determining the size of the thickness controlling bead 201 having the predetermined shape, various other methods may be used. Although the size of the thickness controlling bead 201 is intended to be uniformly manufactured, since the sizes of the respective manufactured thickness controlling beads 201 may not be completely the same as each other, the size of the thickness controlling bead 201 to be described below may be set as, for example, an average value of the sizes of the thickness controlling beads 201.

Meanwhile, in order to uniformly manufacture the size of the thickness controlling bead 201, uniformly manufacturing the size of the thickness controlling bead 201 may be achieved by manufacturing the thickness controlling bead 201 under an accurate condition during manufacturing, extracting a thickness controlling bead 201 having a size in a predetermined range by filtering the manufactured thickness controlling bead 201 with a sieve, and the like. However, this is just an example and available even by other known method.

Referring to FIG. 5, the thickness of the light conversion layer 1100 is substantially the same as the size of the thickness controlling bead 201. Herein, 'substantially the same' means that the size of the thickness controlling bead 201 corresponds to the thickness of the light conversion layer 1100. Herein, 'corresponds' does not just mean that the length is accurately matched but includes that an evitable difference occurs due to various causes in manufacturing. For example, the case in which the size of the thickness controlling bead 201 corresponds to the thickness of the light conversion layer 1100 may mean a case in which a ratio of the thickness of the thickness controlling bead 201 and the thickness of the light conversion layer 1100 is in the range of 0.8 to 1.2, preferably mean a case in which the ratio is in the range of 0.9 to 1.1, and more preferably mean a case in which the ratio is in the range of 0.95 to 1.05.

The thickness controlling beads 201 is preferably disposed to have a uniform interval. In manufacturing the existing quantum dot sheet, both thickness-direction uniformity and plane-direction uniformity of the thickness controlling bead 201 should be considered, but in manufacturing the quantum dot sheet 1001 according to the exemplary embodiment, only the plane-direction uniformity of the thickness controlling bead 201 is considered. Accordingly, in the exemplary embodiment, it is easier to increase the uniformities of the thickness controlling beads 201. When the uniformity of the thickness controlling bead 201 increases as such, the uniformities of the quantum dots 100 increase and it is easier to prevent a condensation phenomenon between the quantum dots 100. Meanwhile, a uniform layout of the thickness controlling beads 201 may be achieved by sufficiently taking a time of mixing at the time of manufacturing the light conversion layer 1100.

In the quantum dot sheet 1001 of the exemplary embodiment, the thickness controlling bead 201 is significantly larger than the quantum dot 100 and the thickness of the light conversion layer 1100 is formed to correspond to the size of the thickness controlling bead 201. Accordingly, in the exemplary embodiment, an agglomeration phenomenon between the quantum dots 100 or the thickness controlling beads 201 may be prevented, and as a result, the quantum dots 100 may be uniformly distributed in the light conversion layer 1100. Further, when the quantum dot sheet 1001 of the present invention is used, the agglomeration phenomenon may be resolved, in which the incident light primarily reaches only some quantum dots 100 positioned on a vertical top of the light conversion layer 1100 to un-uniformly shorten the life-span of some quantum dots 100. By improving such a phenomenon, the quality of the light emitted from the quantum dot sheet 1001 according to the present invention may be more uniformly maintained as compared with the quality of the light emitted from the quantum dot sheet in the related art.

Hereinafter, configurations of back light units 600 and 800 including the quantum dot sheets 1000 and 1001 according to the exemplary embodiment of the present invention will be described in detail with reference to the accompanying drawings.

Back Light Unit Including Quantum Dot Sheet

Figure 6A:
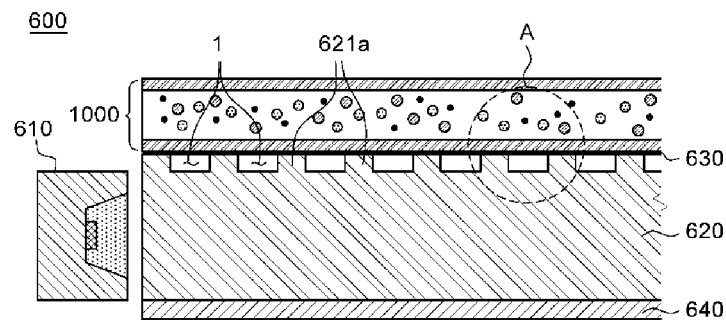
FIGS. 6A to 6C are a schematic cross-sectional view of a back light unit according to an exemplary embodiment of the present disclosure.
Figure 6B:
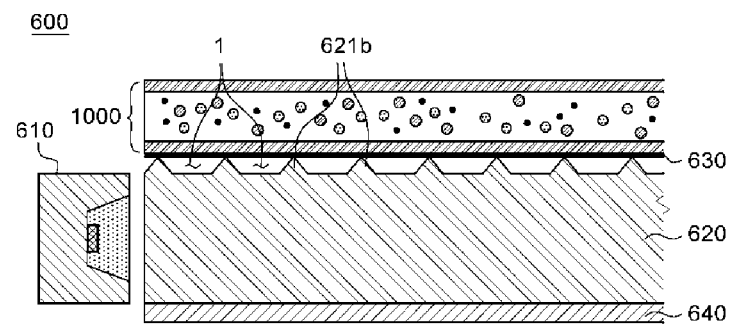
Figure 6C:
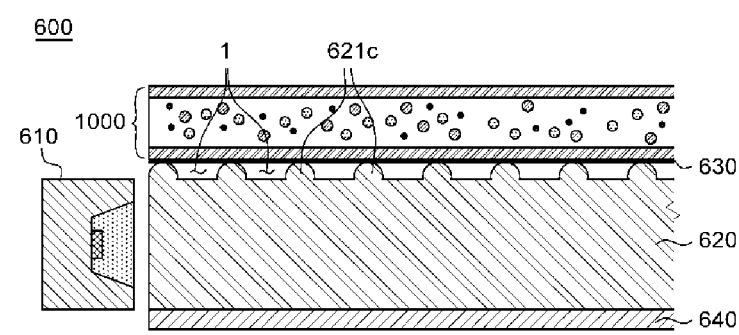
Figure 7A:
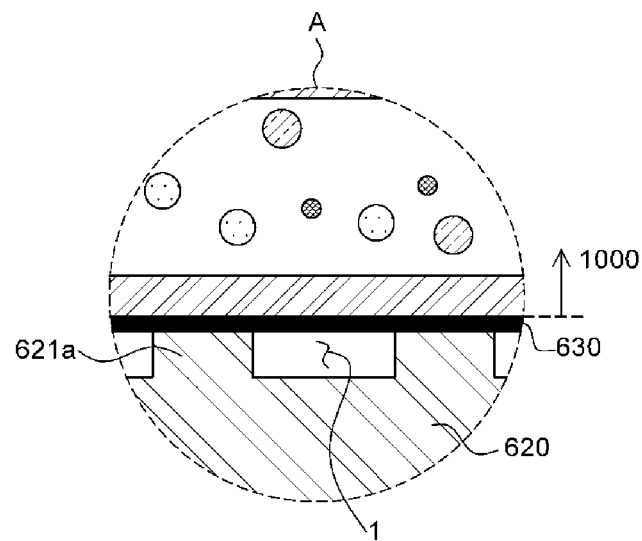
FIGS. 7A to 7B are an enlarged view illustrating region A of FIG. 6A.
Figure 7B:
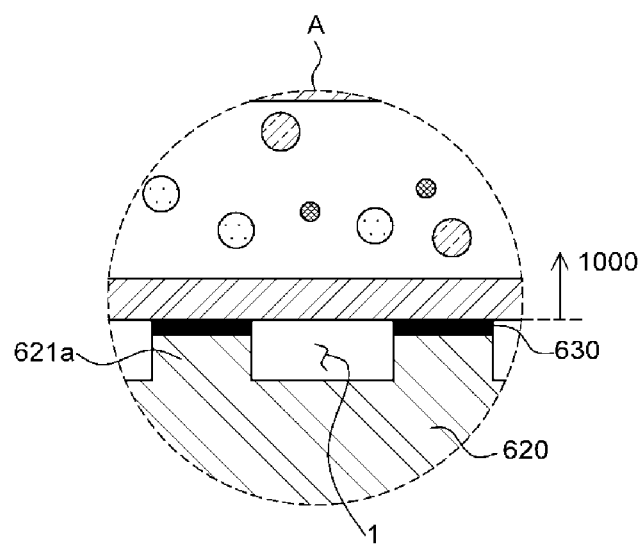

FIGS. 6A to 6C are a schematic cross-sectional view of a back light unit 600 according to an exemplary embodiment of the present invention and FIGS. 7A to 7B are an enlarged view illustrating region A of FIG. 6A.

The back light unit 600 according to the exemplary embodiment is illustrated as an edge lighting type back light unit. However, the present invention is not limited thereto and the quantum dot sheets 1000 and 1001 of the present invention may be applied even to a direct lighting type back light unit, of course.

Quantum dot sheets which may be included in the back light unit 600 according to the exemplary embodiment are the quantum dot sheets 1000 and 1001 according to the exemplary embodiment of the present invention described above. Hereinafter, the quantum dot sheet 1000 according to the exemplary embodiment is described, but the quantum dot sheet 101 according to another exemplary embodiment may be applied, of course. Since the quantum dot sheets 1000 and 1001 have been described in detail, duplicated description will be omitted.

Referring to FIGS. 6A to 6C, the back light unit 600 according to the exemplary embodiment of the present invention includes a light source 601, a light guide plate 620, a quantum dot sheet 1000, and an adhesive unit 630.

Meanwhile, the back light unit 600 according to the present invention may include a quantum dot sheet in which the barrier layer 1200 of the quantum dot sheet 1000 or a lower base film (not illustrated) is omitted.

The light source 610 may be disposed on one side of the light guide plate 620, and the quantum dot sheet 1000 adheres onto the light guide plate 620 so that an air layer 1 is formed between the light guide plate 620 and the quantum dot sheet 1000. In this case, the adhesive unit 630 is formed between the light guide plate 620 and the quantum dot sheet 1000 so that the light guide plate 620 and the quantum dot sheet 100 are fixed to each other.

The light source 610 irradiates light to the inside of the light guide plate 620. The light source 610 is preferably a light emitting diode (LED) which is small in power consumption and excellent in color reproducibility. However, the light source 610 is not limited thereto and any light source known to those skilled in the art may be used.

Since the light irradiated by the light source 610 passes through the light guide plate 620, the light guide plate 620 is preferably made of a material having high transmittance. The material may be poly methyl methacrylate (PMMA) and besides, the light guide plate 620 may be made of a predetermined known to those skilled in the art.

Referring to FIGS. 6A to 6C, the light guide plate 620 includes embossing patterns 621*a*, 621*b*, and 621*c* having a certain height on the top thereof. The certain air layer 1 is secured between the light guide plate 620 and the quantum dot sheet 1000 by the embossing patterns 621*a*, 621*b*, and 621*c*.

Even in the back light unit in the related art, when the quantum dot sheet 1000 adheres onto the top of the light guide plate 620, the air layer 1 is minutely present. However, when various optical members are further stacked on the quantum dot sheet 1000, the back light unit in the related art has a structure in which the air layer 1 may not sufficiently be secured between the light guide plate 620 and the quantum dot sheet 1000.

On the contrary, the back light unit 600 according to FIG. 6A is a structure in which the predetermined air layer 1 may be secured between the light guide plate 620 and the quantum dot sheet 1000 even though various optical members are further stacked on the quantum dot sheet 1000.

Since the air layer 1 has a lower refractive index than the light guide plate 620 as approximately 1.0, the light may be actively fully reflected in the light guide plate 620. Accordingly, the back light unit 600 according to the present invention includes the air layer 1 to uniformly diffuse the light to the entirety of the light guide plate 620.

Shapes of the patterns 621*a*, 621*b*, and 621*c* may be a pillar shape of which a cross section has a quadrangular shape, a horn shape of which the cross section has a triangular shape, a hemisphere shape of which the cross section has the semicircular shape, and the like as illustrated in FIGS. 6A to C. Besides, only when the shape of the pattern is formed to be embossed so that the air layer 1 is formed between the light guide plate 620 and the quantum dot sheet 1000, the shape of the pattern is not limited to the aforementioned shapes and may be a known predetermined pattern shape.

As illustrated in FIG. 6A, a shape and an array of the pattern 621*a* are preferably regular as illustrated in FIGS. 6A to 6C, but when the height of the pattern 621*a* is formed to be constant, stereoscopic shapes of adjacent patterns 621*a* may be formed to be different from each other or irregularly repeatedly arrayed and the arrays of the patterns 621*a* may be formed at an irregular interval.

The height of the pattern 621*a* is preferably 20 μm or less in order to implement the back light unit 600 thinly. However, the present invention is not limited thereto and the height and the width of the pattern 621*a* may be synthetically determined according to a design specification including the thickness of the back light unit 600, and the like.

Referring to FIGS. 6A,7A and 7B, the adhesive unit 630 is formed on the embossing pattern 621*a* included in the top of the light guide plate 620. The adhesive unit 630 fixes the quantum dot sheet 1000 onto the pattern 621*a* of the light guide plate 620.

A method for forming the adhesive unit 630 is not particularly limited only when the air layer 1 is secured between the light guide plate 620 and the quantum dot sheet 1000. For example, a liquid adhesive material may be applied and formed by a roller and a solid adhesive film may be attached and formed. Further, the adhesive unit 630 is formed on the pattern 621*a* of the light guide plate 620, and as a result, the bottom of the quantum dot sheet 1000 may adhere onto the adhesive unit 630 and the adhesive unit 630 is formed on the bottom of the quantum dot sheet 1000, and as a result, the adhesive unit 630 may adhere onto the pattern 621*a* of the light guide plate 620.

The adhesive unit 630 may be formed on an entire surface between the light guide plate 620 and the quantum dot sheet 1000 as illustrated in FIG. 7A. Further, the adhesive unit 630 may be formed at a peak portion of the pattern 621*a* in order for the adhesive unit 630 to minimize an influence exerted onto optical performance while exhibiting adhesive performance as illustrated in FIG. 7B. In particular, when the adhesive unit 630 is made of the liquid adhesive material, the adhesive unit 630 is preferably formed only at the peak portion of the pattern 621a as illustrated in FIG. 7B. The reason is that even though the adhesive unit 630 is pressed by the quantum dot sheet 1000 adhering onto the adhesive unit 630, the adhesive material is prevented from covering the entire stereoscopic shape of the pattern 621a or invading the air layer 1. Of course, the adhesive unit 630 may be formed on the entirety of the pattern 621a as illustrated in FIG. 7A, but in this case, the adhesive material is preferably rapidly cured before flowing down along the stereoscopic shape of the pattern 621a.

In order to form the thickness of the back light unit 600 thinly, the thickness of the adhesive unit 630 is preferably formed to be 10 μm or less.

A curable adhesive material forming the adhesive unit 630 may be a UV curable material or a heat curable material. As the adhesive material, any adhesive material known to those skilled in the art may be used. The adhesive material is not particularly limited, but adhesive force of the adhesive unit 630 may be 100 to 1000 g/25 mm so that the pattern 621a of the light guide plate 620 and the quantum dot sheet 1000 strongly adhere to each other.

Meanwhile, in order to focus the light incident in the light guide plate 620 on the top, the bottom of the light guide plate 620 may further include a specific-shape guide pattern (not illustrated). The guide pattern may be formed to be embossed or engraved and formed in various known shapes. Various methods known to those skilled in the art may be formed, which include a method in which a density of the guide pattern is gradually higher as the guide pattern is farther away from a light receiving unit of the light guide plate 620.

The back light unit 600 may further include a reflection sheet 640 on the bottom or the side of the light guide plate 620. The reflection sheet 640 may be disposed on the bottom of the light guide plate 620 as a shape of a plate and attached onto the bottom or the side of the light guide plate 620.

Hereinafter, a back light unit 800 according to another exemplary embodiment of the present invention will be described with reference to FIGS. 8, 9A, and 9B.

Figure 8:
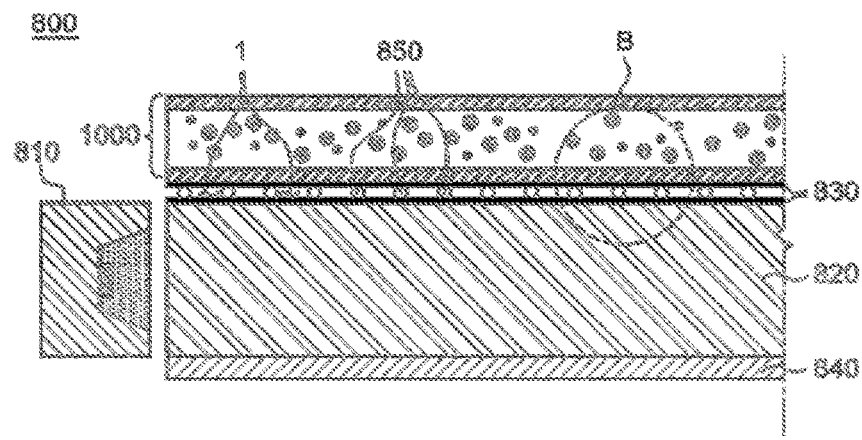
FIG. 8 is a schematic cross-sectional view of a back light unit according to another exemplary embodiment of the present disclosure.
Figure 9A:
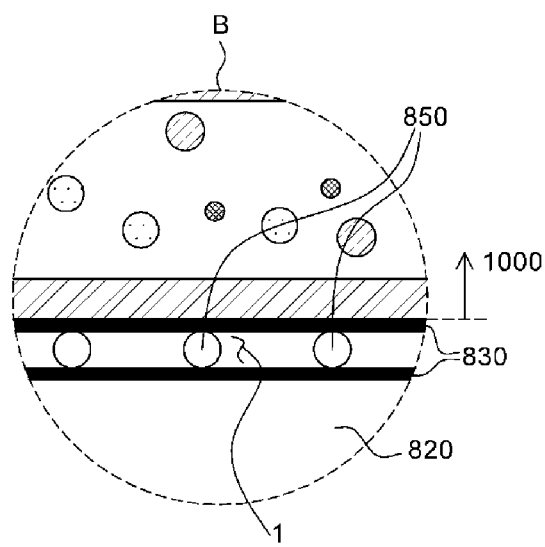
FIGS. 9A to 9B are an enlarged view illustrating region B of FIG. 8.
Figure 9B:
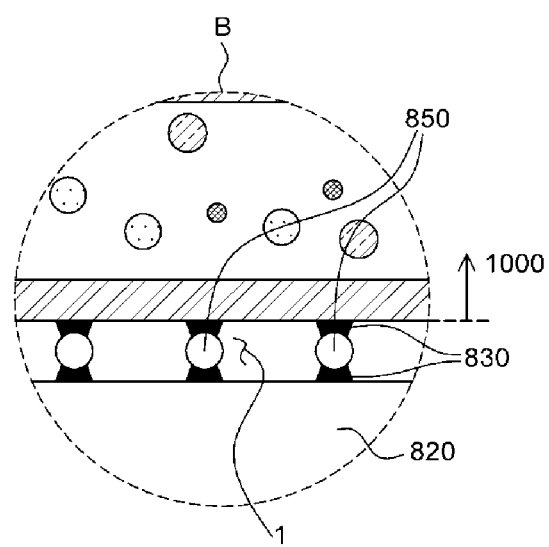

FIG. 8 is a schematic cross-sectional view of a back light unit 800 according to another exemplary embodiment of the present invention and FIGS. 9A and 9B are an enlarged view illustrating region B of FIG. 8.

Referring to FIG. 8, the back light unit 800 according to the exemplary embodiment of the present invention includes a light source 801, a light guide plate 820, the quantum dot sheet 1000, a spacer 850, and an adhesive unit 830. The light source 810 is disposed on one side of the light guide plate 820 and the quantum dot sheet 1000 adheres onto the light guide plate 820. In this case, the back light unit 800 includes a plurality of spacers 850 and the adhesive unit 830 between the light guide plate 820 and the quantum dot sheet 1000 so that the light guide plate 820 and the quantum dot sheet 1000 are fixed to each other while the air layer 1 is formed between the light guide plate 820 and the quantum dot sheet 1000.

The back light unit 800 according to the exemplary embodiment of the present invention of FIGS. 8,9A and 9B is different from the back light unit 600 of FIGS. 6A to 6C and 7 only in that the back light unit 800 does not include the embossing patterns 621a, 621b, and 621c components and includes the spacer 850 component, and both back light units are substantially the same as each other in terms of other components, therefore, duplicated description thereof will be omitted.

Referring to FIGS. 8,9A, and 9B, the back light unit 800 includes the plurality of spacers 850 between the light guide plate 820 and the quantum dot sheet 1000. The certain air layer 1 is secured between the light guide plate 820 and the quantum dot sheet 1000 by the spacer 850.

The plurality of spacers 850 preferably has the spheral shape having a uniform size as illustrated in FIG. 8. However, when the heights of the spacers 850 are formed to be constant, the shapes of the spacers 850 are not limited to the spheral shape and may be the oval shape or the polygonal stereoscopic shape. Further, the stereoscopic shapes of adjacent spacers 850 may be formed to be different from each other or the spacers 850 having various stereoscopic shapes may be irregularly repeatedly arrayed.

The size of the spacer 850 is preferably 2 μm or more in order to implement the back light unit 800 thinly. The size of the spacer 850 means a diameter of the spacer 850 when the spacer 850 has the spheral shape. Further, when the spacer 850 has not the spheral shape but a predetermined shape, a diameter of a globe having a minimum size set to include all of the spacers 850 therein may be set as the size of the spacer 850. As a method for determining the size of the spacer 850 having the predetermined shape, various other methods may be used. Although the size of the spacer 850 is intended to be uniformly manufactured, since the sizes of the respective manufactured spacers 850 may not be completely the same as each other, the size of the spacer 850 to be described below may be set as, for example, an average value of the sizes of the spacers 850.

Meanwhile, in order to uniformly manufacture the size of the spacer 850, uniformly manufacturing the size of the spacer 850 may be achieved by manufacturing the spacer 850 under an accurate condition during manufacturing, extracting a spacer 850 having a size in a predetermined range by filtering the spacer 850 with the sieve, and the like. However, this is just an example and available even by other known method.

Referring to FIGS. 8,9A, and 9B, the thickness of the air layer 1 is substantially the same as the size of the spacer 850. Herein, 'substantially the same' means that the size of the spacer 850 corresponds to the thickness of the air layer 1. Herein, 'corresponds' does not just mean that the length is accurately matched but includes that an evitable difference occurs due to various causes in manufacturing. For example, the case in which the size of the spacer 850 corresponds to the thickness of the air layer 1 may mean a case in which a ratio of the thickness of the spacer 850 and the thickness of the air layer 1 is in the range of 0.8 to 1.2, preferably mean a case in which the ratio is in the range of 0.9 to 1.1, and more preferably mean a case in which the ratio is in the range of 0.95 to 1.05.

Further, the spacers 850 are preferably regularly arrayed to be included in the back light unit 800 with a number to cover 10 area % or less of the top of the light guide plate 820 in order to prevent light transmittance of the back light unit 800 from being deteriorated as illustrated in FIG. 8. However, the present invention is not limited thereto and the number and the layout of the spacers 850 may be synthetically determined according to a design specification including the light transmittance, the thickness, and manufacturing cost of the back light unit 800.

The spacer 850 may be formed to include metal oxide particles, glass, or a high-molecule polymer in which light transparence is excellent and made of a mixture in which the metal oxide particles, the glass, and the high-molecule polymer are mixed. Besides, the spacer 850 may be made of a predetermined transparent material known to those skilled in the art.

Referring to FIGS. 9A to 9B, the adhesive unit 830 is formed on the top of the light guide plate 820 and the bottom of the quantum dot sheet 1000. The adhesive unit 830 serves to fix the light guide plate 820 and the bottom of the quantum dot sheet 1000 to each other. In this case, the spacer 850 also forms the air layer 1 between the light guide plate 850 and the quantum dot sheet 1000 while being fixed between the light guide plate 820 and the quantum dot sheet 1000 by the adhesive unit 830.

Since the method for forming the adhesive unit 830 and the material for forming the adhesive unit 830 are the same as those described above, duplicated description thereof will be omitted.

The exemplary embodiments of the present disclosure have been described above with reference to the accompanying drawings, but those skilled in the art will understand that the present disclosure may be implemented in another specific form without changing the technical spirit or an essential feature thereof. Therefore, the aforementioned exemplary embodiments are all illustrative in all aspects and are not limited.

The invention claimed is:

1. A quantum dot sheet comprising quantum dots, light scattering agents, and a resin,
   wherein the resin includes repeated units represented by the following Chemical Formula 1

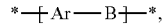

[Chemical Formula 1]

in Chemical Formula 1, Ar is an aryl group of $C_6$-$C_{30}$, and B is a substituted or unsubstituted alkyl group of $C_2$-$C_5$.

2. The quantum dot sheet of claim 1, wherein the resin has an average interatomic distance of 0.2 nm to 2.0 nm.

* * * * *